United States Patent [19]
Kenjyo

[11] Patent Number: 4,719,612
[45] Date of Patent: Jan. 12, 1988

[54] METHOD OF DETECTING DEFECTS ON AN OPTICAL RECORD MEDIUM AND A DEVICE FOR CARRYING OUT THE METHOD

[75] Inventor: Hideyuki Kenjyo, Koganei, Japan

[73] Assignee: Olympus Optical Company Limited, Tokyo, Japan

[21] Appl. No.: 745,017

[22] Filed: Jun. 14, 1985

[30] Foreign Application Priority Data

Jun. 15, 1984 [JP] Japan .................. 59-123259

[51] Int. Cl.⁴ .......... G11B 7/00; G11B 20/18
[52] U.S. Cl. ...................... 369/54; 369/58; 369/124; 358/336
[58] Field of Search .............. 369/58, 54; 358/336

[56] References Cited

U.S. PATENT DOCUMENTS 4,308,612 12/1981 Miyouchi ................... 369/58
4,554,652 11/1985 Maeda ...................... 369/58

FOREIGN PATENT DOCUMENTS 212629 12/1982 Japan ...................... 369/54

*Primary Examiner*—Alan Faber
*Attorney, Agent, or Firm*—Bruce L. Adams; Van C. Wilks

[57] ABSTRACT

A method of detecting defects formed on an optical record medium for use in an optical information recording and reproducing apparatus. The method comprises steps of deriving light output signals reflected from the record medium at the time of information writing, comprising the light output signals with reference signals which are set to a plurality of desired levels, and logically operating the compared output signals thereby detecting and evaluating the defects formed on the surface of the record medium.

15 Claims, 7 Drawing Figures

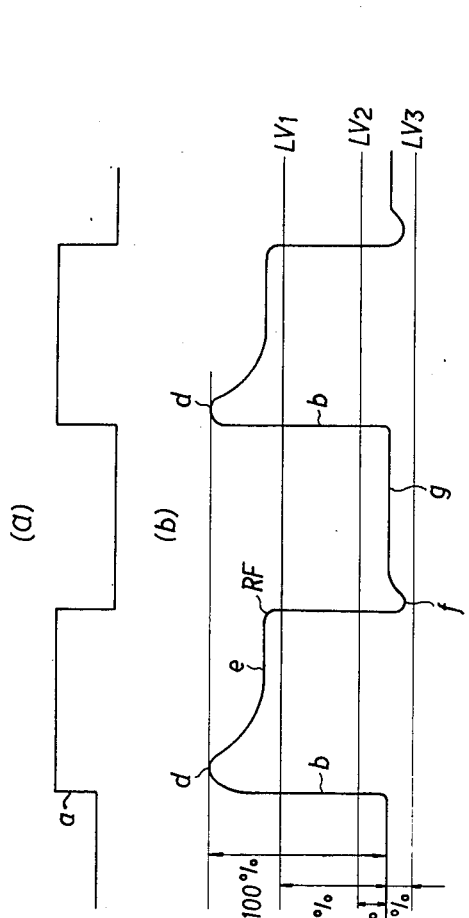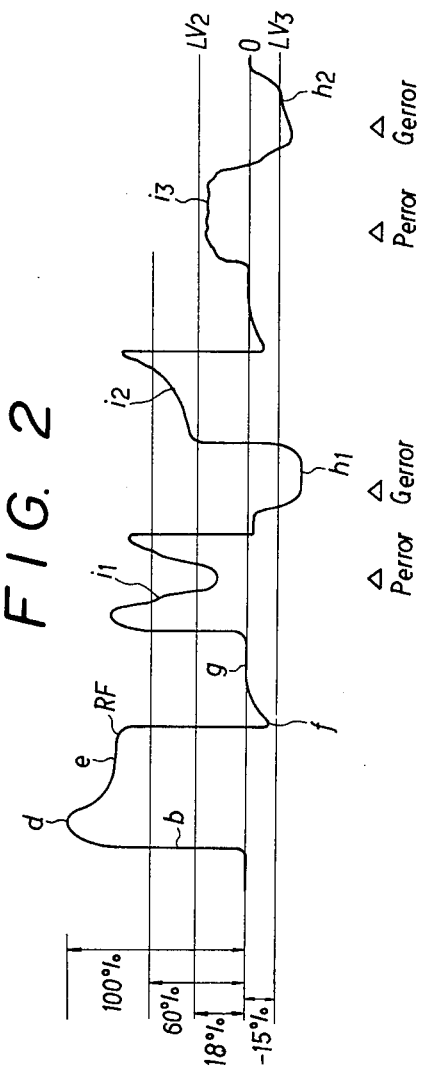

METHOD OF DETECTING DEFECTS ON AN OPTICAL RECORD MEDIUM AND A DEVICE FOR CARRYING OUT THE METHOD

BACKGROUND OF THE INVENTION

The present invention relates to a method of detecting defects formed on an optical record medium for use in an optical information recording and reproducing apparatus and a device for carrying out the method.

In an apparatus for recording and/or reproducing information by light beam, the recording of information is performed by rotating a disc covered with a thermoplastic film or a metal film (hereinafter referred to as a record medium), irradiating laser beam modulated according to information and focused to form a fine spot having $1\mu$ diameter onto the record medium and forming a finely changed portion (usually referred to as pit) on the surface of the record medium.

As shown in FIG. 1a, for example, it is assumed that a pulse-shaped writing signal modulated with information is a laser drive signal a. When the signal a has a power larger than a specific writing threshold level for the record medium, the surface portion of the record medium is subjected to a variation or change such as dissolution, deformation or crysterization so that a reflected light outputs b (hereinafter referred to as RF signal) can be obtained from light receiving elements which detect light reflected from the surface of the record medium. As seen from the waveform of the RF signals b, during recording time the RF signals have an amplitude of maximum peak d from the beginning time of information writing to the time at which the surface of the record medium begins to change, and then the intensity of the RF signal decreases by an interface generated due to the formation of the pit and the decrease of reflection factor and thus stationary outputs e are generated after completion of writing. In the DRAW method (Direct Read After Write method), furthermore, even after ending of writing pulse the laser generates weak light beam so that the reflected light outputs have an amplifier of minimum peak f at the portion at which pits are already formed, and then stationary outputs g can be obtained.

As a defect formed on the surface of the record medium, generally, there are two types of defects, one being a defect formed on the pit portion and the other being a defect formed on the groove portion. As shown in FIG. 2, the defect formed on the pit portion appears on the RF signal as waveforms of, for example, $i_1$, $i_2$ and $i_3$.

The defect formed on the groove portion appears on the RF signal as waveforms of $h_1$ and $h_2$.

Means for detecting such defects is disclosed in Japanese Patent Laid-open No. 212629/82. These prior arts decide whether the writing is normal or abnormal by monitoring dynamic change and change in time of the reflected light quantity at the time of writing.

These defect detections can be applied to only the case of low signal recording density and can not be applied to the case of high density signal recording of 1 $MH_z$. These defect detections have bad precision. This causes not only over detection but also under detection so that recording density is decreased and efficiency of the record medium is deteriorated.

SUMMARY OF THE INVENTION

It is an object of the present invention to overcome the above described disadvantages of the conventional defect detecting method.

It is another object of the present invention to provide a method and a device for detecting defects formed on an optical record medium applied to high density signal recording of 1 $MH_z$ to 3 $MH_z$.

According to the present invention there is provided a method of detecting defects on an optical record medium for use in an optical information recording and reproducing apparatus comprising steps of detecting light output signals reflected from the record medium at the time of information writing, comparing the light output signals with reference signals which are set to have a plurality of desired levels, and logically processing the compared output signals thereby detecting and evaluating the defects formed on the surface of the record medium.

The device comprises means for generating strobe pulses thereby performing the logic operation. The strobe pulses are formed by delaying information write pulses, and subjecting the delayed pulses to exclusive-OR operation.

According to the present invention, there is also provided a device for detecting defects on an optical record medium for use in an optical information recording and reproducing apparatus comprising means for comparing light output signals reflected from the record medium at the time of information writing with reference signals which are set to have a plurality of desired levels, and means for logically processing the compared output signals thereby detecting and evaluating the defects on the surface of the record medium.

The logically processing means comprises means for generating strobe pulses thereby performing the logical operation. The comprising means comprises a level discrimination circuit for discriminating the light output signals to generate pit error signals and groove error signals. The logically processing means comprises a pit error detection circuit connected to the level discrimination circuit for generating pit error pulse, and a groove error detection circuit connected to the level discrimination circuit for generating a groove error pulse, an OR circuit connected to the pit error and the groove error detection circuits for carrying out OR function, and a signal processing circuit connected to the OR circuit for generating the defect detection pulse and defect signal. The strobe pulse generating means comprises a signal processing and delay circuit connected so as to receive information writing pulses, and a logic circuit connected to the signal processing and delay circuit for generating strobe pulses.

BRIEF DESCRIPTION OF THE DRAWINGS

FIGS. 1a and 1b are explanatory views showin waveforms of light output signals (RF signal) reflected from a record medium for controlling the writing of light information;

FIG. 2 is an explanatory view showing waveforms of pit error signal and groove error signal;

DESCRIPTION OF THE PREFERRED EMBODIMENT

Referring to FIGS. 2 to 6, there is shown a method and a device for detecting at least two kinds of optical defects formed on an optical record medium according to the present invention.

Figure 3:
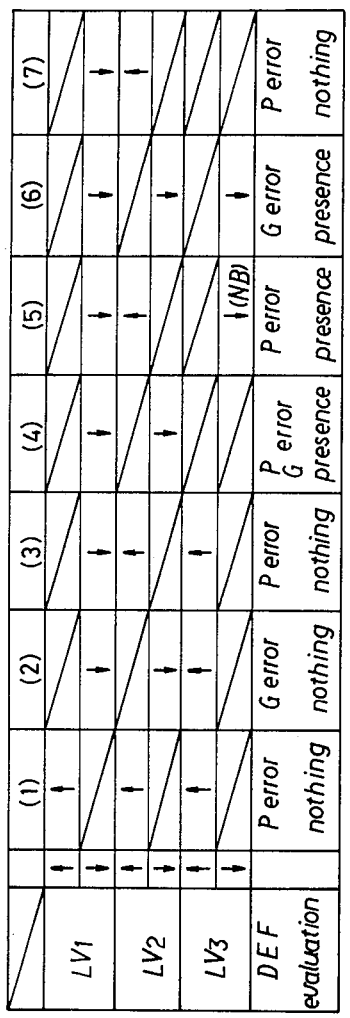
FIG. 3 is an explanatory view showing a principle of a method of detecting defects formed on the surface of an optical record medium according to the present invention.

As shown in FIGS. 2 and 3, in the present embodiment the RF signal is compared with predetermined three levels of the reference threshold signal. Namely, it is assumed that the maximum amplitude level of the RF signal is 100%, and these three levels are defined as follows. The level 1 ($LV_1$) is 60% of the maximum amplitude, the level 2 ($LV_2$) is 18% of the maximum amplitude and the level 3 ($LV_3$) is $-15\%$ of the maximum amplitude. The present method is used to defect whether the amplitude level of the RF signal is positioned above or below the respective reference levels, and the detected results are subjected to logic processing as shown in FIG. 3 so that presence or absence of pit (P) error and groove (G) error can be detected by the combination of the processed results thereby determining defects formed on the surface of the record medium.

In this case the upper reference level 2 ($LV_2$) is used for detection of pit error and the lower reference level 3 ($LV_3$) is used for detection of groove error.

Figure 4:
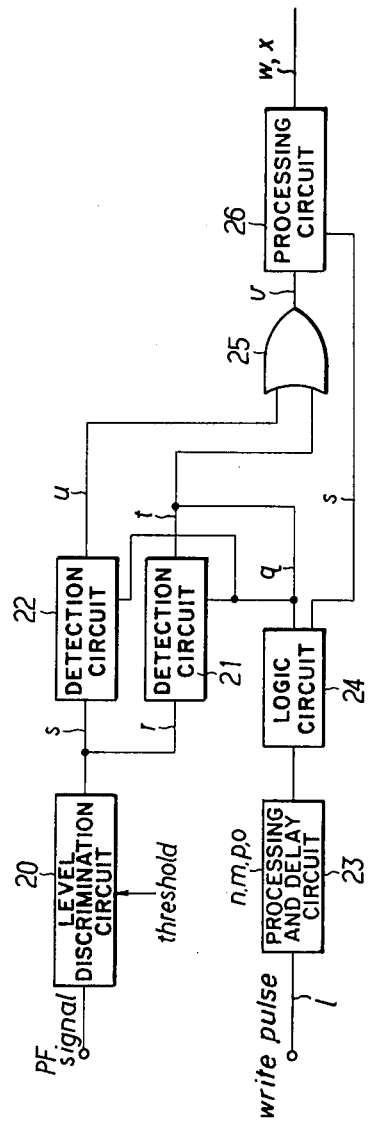
FIG. 4 is a block diagram showing a device for carrying out the method shown in FIG. 3.
Figure 5:
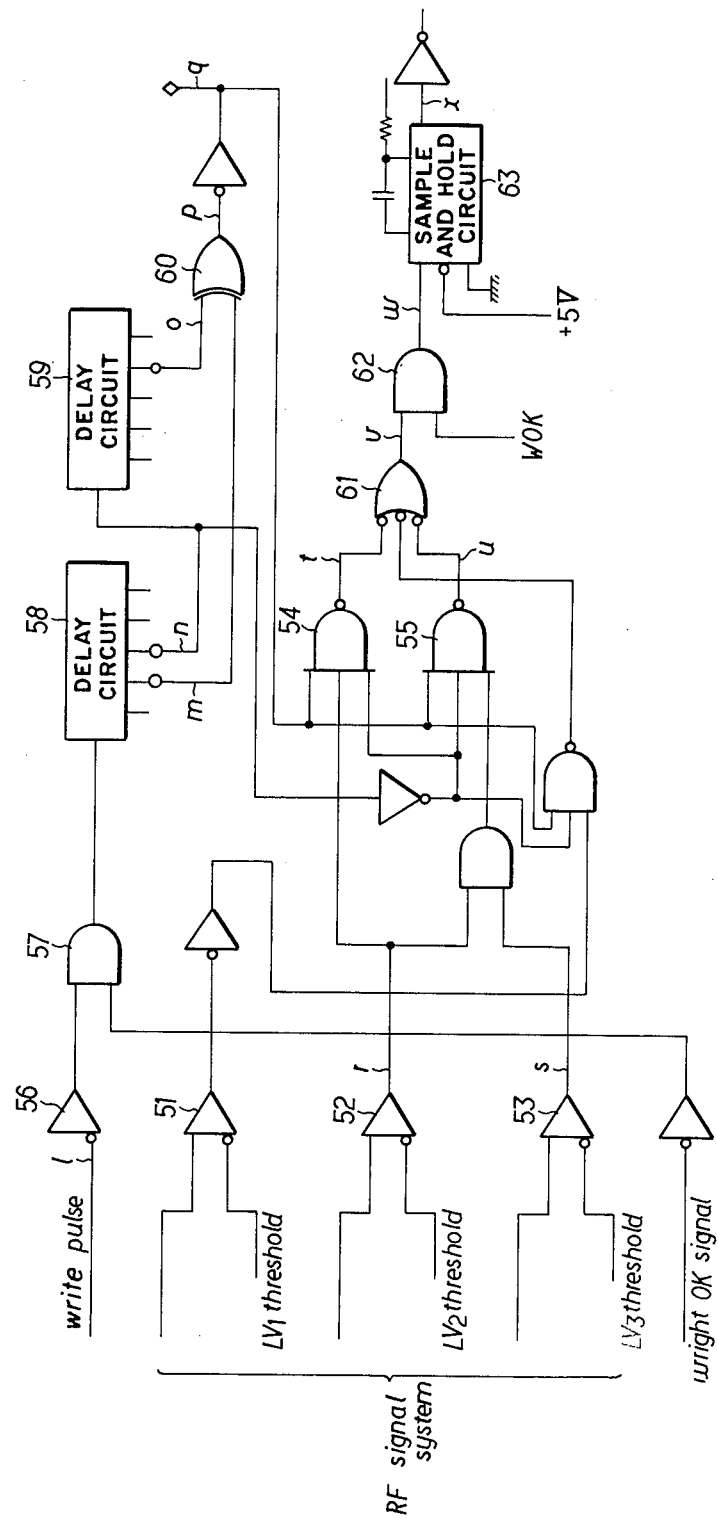
FIG. 5 is a circuit diagram showing the device shown in FIG. 4.
Figure 6:
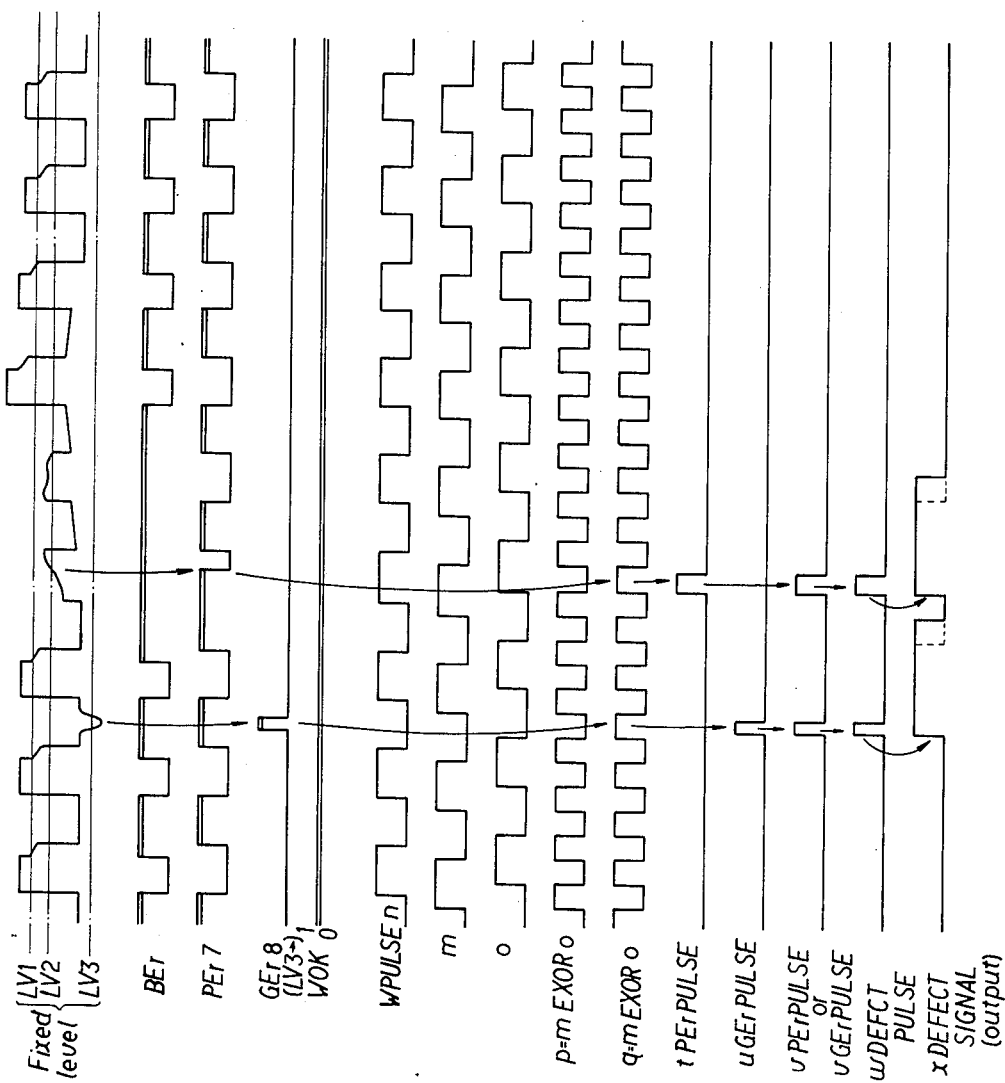
FIG. 6 is a time chart showing the timing of signals generated in the device shown in FIG. 5.

FIGS. 4 to 6 show a device for carrying out the method according to the present invention.

As shown in FIG. 4, the light beam reflected from the record medium is converted into an electric signal by detecting means in the form of a light receiving element thereby forming the reflected light output signal, that is RF signal. This RF signal is supplied to comparing means in the form of a level discrimination circuit 20 thereby producing a pit error signal r or first compared signal when the RF signal falls below the upper reference level $LV_2$, and a groove error signal s or second compared signal when the RF signal falls below the lower reference level $LV_3$. The pit error signal r is supplied to a pit error detection or processing circuit 21 and the groove error signal s is supplied to a groove error detection or processing circuit 22.

An information writing pulse or clock pulse for modulating the light beam e is supplied to a signal processing and delay circuit 23 thereby obtaining delayed pulses m, n, o and p. These delayed pulses are supplied to a logic circuit 24 to obtain a desired strobe pulse q. The strobe pulse q is supplied to the pit error detection circuit 21 and the groove error detection circuit 22 thereby generating a pit error pulse t and a groove error pulse u in synchronization with the strobe pulses. These pulses t and u are supplied to an OR circuit 25 and the output signal v is supplied to a signal processing circuit 26 to generate a defect detection pulse w and a defect signal x thereby controlling the writing of the information signal. The circuit 26 is set by reset pulses formed by the delay circuit 23.

FIG. 5 shows a detailed circuit construction of the device for carrying out the method according to the present invention. Namely, the RF signal level discrimination circuit 20 shown in FIG. 4 is constructed by three comparators 51, 52 and 53, the levels of which are set as described above. The pit error detection circuit 21 is formed of an AND circuit 54 which effects the product of the first compared signal and the strobe pulses, the groove error detection circuit 22 is formed of an AND circuit 55 which effects the product of the second compared signal and the strobe pulses, the signal processing and delay circuit 23 is formed of an inverter 56, an AND circuit 57, delay circuits 58 and 59 for differently delaying the clock pulses, the logic circuit 24 is formed of an exclusive OR circuit 60 which exclusively sums the outputs from the delay circuits 58 and 59 to produce the strobe pulses having a pulse duration smaller and a frequency twice higher than those of the cleck pulses, the OR circuit 25 is formed of an OR element 61, and the signal processing circuit 26 is formed of an AND circuit 62 and a sample and hold circuit 63, respectively. These circuit elements are connected with each other as shown in FIG. 5.

FIG. 6 shows signals generated at various portions of the circuit elements, that is, the timing chart of defect detection signals.

In FIG. 6 reference numeral 64 is an RF signal, levels $LV_1$, $LV_2$ and $LV_3$ are reference thresholds, $BE_r$ is an output signal of the comparator for detecting burst error, $PE_r$ r an output signal of the comparator for detecting pit error $GE_r$ s is a groove error output signal detected according to the level $LV_3$, WOK is an instruction signal for instructing the writing action, signals m, n and o are pulses obtained by delaying the writing pulses, signals p and q are strobe pulses obtained by the delayed pulses, t is $PE_r$ pulse obtained by detecting and strobe-processing the pit error signal, u is $GE_r$ pulse obtained by detecting and strobe-processing the groove error signal, v is an output of the OR circuit obtained by OR-operating or summing pulses t and u, and w and x are a defect pulse and a defect signal indicative of the existence of the two kinds of optical defects and obtained by logically processing the pulse v.

Alternatively, a write and read strobe pulse may be used by combining the write strobe pulse and the read strobe pulse. The threshold may be set to proper value.

The delay element and the logic element may be replaced by a microcomputer.

What is claimed is:

1. A method of detecting different kinds of defects on an optical record medium for use in an optical information recording and reproducing apparatus comprising the steps of producing light output signals from light beams reflected from the record medium at the time of information writing controlled by information write pulses, comparing the light output signals with reference signals having a plurality of different predetermined threshold levels corresponding to the different kinds of defects to produce compared output signals, producing strobe pulses by delaying the information write pulses and subjecting the delayed information write pulses to exclusive-OR processing, and logically processing the compared output signals in synchronization with the strobe pulses to thereby determine the kinds of defects formed on the surface of the record medium.

2. A device for detecting different kinds of defects on an optical record medium for use in an optical information recording and reproducing apparatus comprising: means for producing light output signals from light beams reflected from the record medium at the time of information writing controlled by information write pulses, means for comparing the light output signals with reference signals having a plurality of different predetermined threshold levels corresponding to the different kinds of defects so as to produce compared output signals, delay means for receiving the information write pulses to delay the same, exclusive-OR gate means connected to the delay means for producing strobe pulses through the exclusive-OR operation thereof, and means for logically processing the compared output signals in synchronization with the strobe pulses to thereby determine the kinds of defects formed on the surface of the record medium.

3. A device for detecting defects on an optical record medium as claimed in claim 2, wherein the comparing means comprises a level discrimination circuit for discriminating the light output signals to generate compared output signals in the form of pit error signals and groove error signals.

4. A device for detecting defects on an optical record medium as claimed in claim 3, wherein the logically processing means includes a pit error detection circuit connected to the level discrimination circuit for receiving the pit error signals, a groove error detection circuit connected to the level discrimination circuit for receiving the groove error signals, an OR circuit connected to the pit error and the groove error detection circuits for operating an OR function, and a signal processing circuit connected to the OR circuit for generating a defect detection pulse and a defect signal.

5. In a device for detecting at least two kinds of optical defects on an optical record medium during writing information thereon by intermittently irradiating an optical beam thereon in synchronization with clock pulses, the device comprising: detecting means for detecting an optical beam reflected from the optical record medium to produce a corresponding output signal; comparing means having means defining predetermined upper and lower reference levels corresponding to the two kinds of optical defects for comparing the output signal with the upper and lower reference levels to produce first and second compared signals when the output signal falls below the upper and lower reference levels respectively; strobe means for modulating the clock pulses to produce strobe pulses having a pulse duration smaller than and a frequency higher than those of the clock pulses; and processing means for logically processing the first and second compared signals in synchronization with the strobe pulses to produce defect signals indicative of the existence of the two kinds of optical defects.

6. A device as claimed in claim 5; wherein the comparing means comprises a pair of comparators having upper and lower threshold levels respectively.

7. A device as claimed in claim 6; wherein the pair of comparators have upper and lower threshold levels corresponding to a pit defect and a groove defect respectively.

8. A device as claimed in claim 5; wherein the strobe means includes means for producing strobe pulses having a frequency twice as high as that of the clock pulses.

9. A device as claimed in claim 5; wherein the strobe means comprises a delay circuit for delaying the clock pulses to produce differently delayed pulses, and an exclusive-OR gate circuit for exclusively summing the differently delayed pulses to produce the strobe pulses.

10. A device as claimed in claim 5; wherein the processing means includes first and second processing circuits for logically processing the first and second compared signals.

11. A device as claimed in claim 10; wherein the first processing circuit comprises a first AND-gate circuit for effecting the logical product of the first compared signal and the strobe pulses, and the second processing circuit comprises a second AND-gate circuit for effecting the logical product of the second compared signal and the strobe pulses.

12. A device as claimed in claim 11; wherein the processing means includes an OR-gate circuit for summing the logical products obtained by the first and second AND-gate circuits to produce the defect signals.

13. A method for detecting at least two kinds of optical defects on an optical record medium during writing information thereon by intermittently irradiating an optical beam thereon in synchronization with clock pulses, the method comprising the steps of: detecting an optical beam reflected from the optical record medium to produce a corresponding output signal; comparing the output signal with upper and lower reference levels corresponding to the two kinds of optical defects to produce first and second compared signals when the output signal falls below the upper and lower reference levels respectively; modulating the clock pulses to produce strobe pulses having a pulse duration smaller than and a frequency higher than those of the clock pulses; and logically processing the first and second compared signals in synchronization with the strobe pulses to produce defect signals indicative of the existence of the two kinds of optical defects.

14. A method as claimed in claim 13; wherein the strobe pulses have a frequency twice as high as that of the clock pulses.

15. A method as claimed in claim 13; wherein the modulating step comprises delaying the clock pulses to produce differently delayed pulses, and exclusively summing the differently delayed pulses to produce the strobe pulses.

* * * * *